(12) United States Patent
Ikeda et al.

(10) Patent No.: US 9,285,061 B2
(45) Date of Patent: Mar. 15, 2016

(54) HOUSING-TYPE PIPE JOINT

(75) Inventors: Shintaro Ikeda, Kusatsu (JP); Yuji Noda, Kusatsu (JP)

(73) Assignee: The Victaulic Company of Japan, Tokyo (JP)

( * ) Notice: Subject to any disclaimer, the term of this patent is extended or adjusted under 35 U.S.C. 154(b) by 828 days.

(21) Appl. No.: 13/515,928

(22) PCT Filed: Dec. 10, 2010

(86) PCT No.: PCT/JP2010/072259
§ 371 (c)(1),
(2), (4) Date: Jun. 14, 2012

(87) PCT Pub. No.: WO2011/074498
PCT Pub. Date: Jun. 23, 2011

(65) Prior Publication Data
US 2012/0256416 A1    Oct. 11, 2012

(30) Foreign Application Priority Data

Dec. 14, 2009   (JP) .................................. 2009-282464
May 13, 2010   (JP) .................................. 2010-110830

(51) Int. Cl.
*F16L 17/04*   (2006.01)
*F16L 21/00*   (2006.01)
*F16L 25/12*   (2006.01)

(52) U.S. Cl.
CPC ............... *F16L 21/005* (2013.01); *F16L 17/04* (2013.01); *F16L 25/12* (2013.01)

(58) Field of Classification Search
CPC ....... F16L 23/18; F16L 21/08; F16L 2201/60; F16L 2201/10; F16L 21/005; F16L 17/04; F16L 25/12

USPC ............ 285/373, 419, 367, 364, 337, 406, 93
See application file for complete search history.

(56) References Cited

U.S. PATENT DOCUMENTS

| 4,471,979 | A  | * | 9/1984 | Gibb | F16L 17/04 285/112 |
|---|---|---|---|---|---|
| 6,076,861 | A | * | 6/2000 | Ikeda | 285/112 |
| 2005/0097763 | A1 | * | 5/2005 | Williams et al. | 33/501.45 |
| 2005/0242585 | A1 | * | 11/2005 | Dole | B21D 17/04 285/367 |
| 2005/0253029 | A1 | * | 11/2005 | Gibb et al. | 248/158 |
| 2008/0169648 | A1 | * | 7/2008 | Kwon | F16L 17/04 285/364 |
| 2008/0284161 | A1 | * | 11/2008 | Dole | F16L 17/04 285/148.8 |

FOREIGN PATENT DOCUMENTS

| CN | 1878978 | 12/2006 |
|---|---|---|
| JP | 11-241793 | 9/1999 |

(Continued)

*Primary Examiner* — Daniel P Stodola
*Assistant Examiner* — Zachary Dragicevich
(74) *Attorney, Agent, or Firm* — Renner, Kenner; Arthur M. Reginelli

(57) ABSTRACT

The present invention is to enable a reduction in a fastening work, the confirmation of a fastening completion position where pipes are surely coupled, and the easy installation of a joint at an appropriate position between pipe ends without dissembling a housing at all, thereby making a work of coupling the pipes an extremely simple operation, and in addition, to make it possible to surely couple and fix the pipes even when there is an error in depth of circumferential grooves of the pipes that are to be coupled, regarding a housing-type pipe joint which couples pipes by its arc portions being bent by fastening elements such as bolts and nuts so that their radii of curvature become smaller.

15 Claims, 13 Drawing Sheets

(56) References Cited

FOREIGN PATENT DOCUMENTS

| JP | 11-241794 | 9/1999 |
|---|---|---|
| JP | 2003-042360 A | 2/2003 |
| JP | 2008-019975 | 1/2008 |
| JP | 2008-019976 | 1/2008 |
| JP | 2009-282464 | 6/2011 |
| WO | WO2005-114023 A | 1/2005 |

* cited by examiner

HOUSING-TYPE PIPE JOINT

TECHNICAL FIELD

The present invention relates to a housing-type pipe joint that couples ends of pipes while sealing them.

BACKGROUND ART

A conventional housing-type pipe joint 100H is shown in FIG. 13. This housing-type pipe joint integrally couples two pipes in the following manner. Pipe ends of pipes 150, 150 having circumferential grooves 151, 151 in pipe end portions are set to abut on each other concentrically, an annular elastic seal ring 102 is fit around an outer side of their joint portion, thereafter a pair of substantially semi-circular joint segments 101, 101 are put on the pipe end portions via the elastic seal ring 102 so that convex strips 113, 113 formed in inner peripheral surfaces of the joint segments 101, 101 are fit in the circumferential grooves 151, 151, and fastening elements composed of bolts 103, 103 and nuts 104, 104 are screwed to bolt insertion holes 121, 121 provided in facing flange portions 120, 120 of the joint segments 101, 101.

Further, in this coupling, as the facing flange portions 120, 120 of the pair of joint segments 101, 101 are made to approach each other by the fastening elements 103, 104, the joint segments 101, 101 are bent so that radii of curvature thereof become smaller, and peripheral edges 114, 114 of the joint segments 101, 101 press and hold pipe outer surfaces (in the shown example, they are bottoms of the circumferential grooves 151 but this is not restrictive) 152, 152, whereby deviation displacement of axes of the both pipes is prevented.

In this coupling, it is confirmed that the coupling by the housing-type pipe joint 100H is completed, when the whole ranges of the peripheral edges 114, 114 of the joint segments 101, 101 match the pipe outer surfaces 152, 152 or when a tightening torque becomes equal to a value pre-designated by using a torque wrench.

However, in coupling the pipes by the housing-type pipe joint 100H, for example, even though the deviation movement of the pipe axes of the pipes 150, 150 is prevented by the peripheral edges 114, 114, it is only necessary that this movement of the aforesaid pipes is sufficiently restricted by the housing-type pipe joint 100H, and the whole ranges of the peripheral edges 114, 114 need not match the pipe outer peripheral surfaces 152, 152.

In the conventional housing-type pipe joint 100H, an appropriate fastening degree is not known, that is, it is not known to what degree the joint segments 101, 101 should be bent and to what degree of ranges the peripheral edges 114, 114 should match the pipe outer surfaces 152, 152 in order for the coupling function to be sufficiently exhibited, and as a result, the facing flange portions 120, 120 of the joint segments 101, 101 have to be made to approach each other until the whole ranges of the peripheral edges 114, 114 match the pipe outer surfaces 152, 152, that is, until the joint segments 101, 101 bend to the largest possible degree, which requires an extremely troublesome and useless operation.

Further, the designation of the tightening torque by the trench wrench requires a troublesome operation such as a need for preparing the trench wrench though being capable of achieving accurate fastening.

Further, attaching such a conventional housing-type pipe joint 100H requires very troublesome operations such as once removing the bolts 103, 103 and the nuts 104, 104 from the flange portions 120, 120 of the joint segments 101, 101, putting the annular elastic seal ring 102 on the joint portion, then fitting the joint segments 101, 101 on the outer side of the elastic seal ring 102 while visually confirming that the stopper pieces 113, 113 are fit in the circumferential grooves, inserting the bolts 103, 103 again through the bolt insertion holes 121, 121 of the facing flange portions 120, 120, and screwing the nuts 104, 104 to the bolts 103, 103.

SUMMARY OF INVENTION

Technical Problem

Therefore, a main object of the present invention is to enable a reduction in a fastening work, the confirmation of a fastening completion position where pipes are surely coupled, and the easy installation of a joint at an appropriate position between pipe ends without dissembling a housing at all, thereby making a work of coupling the pipes an extremely simple operation, and in addition, to make it possible to surely couple and fix the pipes even when there is an error in depth of circumferential grooves of the pipes that are to be coupled, regarding a housing-type pipe joint which couples pipes by its arc portions being bent by fastening elements such as bolts and nuts so that their radii of curvature become smaller.

Solution to Problem

The present invention solving the above problems and its operations and effects are as follows.

<Invention According to Embodiment 1>

A housing-type pipe joint that couples pipes facing each other, which includes a pair of joint segments, an elastic seal ring, and fastening elements fastening the pair of joint segments, and in which the joint segments each have an arc portion, flange portions extending from both ends of the arc portion, and a concave groove formed in an inner peripheral surface of the arc portion to have the elastic seal ring fit therein, and in which the fastening elements make the flanges of the both joint segments approach each other to make the arc portions bend so that radii of curvature of the arc portions become smaller, and when, as a result of the bending, peripheral edges of the arc portions match outer surfaces of the pipes that are to be coupled, the coupling of the pipes is completed, the housing-type pipe joint including marks on peripheral edge regions of the arc portions, and wherein, when positions of the peripheral edges of the arc portions corresponding to the marks come into contact with the outer surfaces of the pipes, the coupling of the pipes is completed.

(Operation and Effect)

In the conventional housing-type pipe joint, since an appropriate fastening degree, that is, a bending amount of the arc portions is not known, it is necessary to make the facing flanges of the segments approach each other until the whole lengths of the peripheral edges of the arc portions match the pipe outer surfaces, that is, until the arc portions bend by the largest possible amount, which requires a very troublesome and useless operation, but since the housing-type pipe joint of the present invention has the marks, it is possible to know in advance abutting ranges of the peripheral edges that are sufficient for the coupling, which eliminates a need for excessively bending the arc portions more than necessary and enables an appropriate fastening work. Therefore, a load of the fastening work is reduced. Further, it is possible to prevent a lateral deviation by positioning the marks at end sides.

Note that "corresponding to the marks" not only means that the marks themselves are completely in contact with the pipe outer surfaces but also means that, for example, the marks are arrows or the like and positions pointed by the arrows or the like are in contact with the pipe outer surfaces.

<Invention According to Embodiment 2>

The housing-type pipe joint according to embodiment 1,

Wherein the housing-type pipe joint couples and fixes pipes each having a circumferential groove in a pipe end portion, wherein the joint segments each have convex strip portions provided on an inner peripheral surface of the arc portion and positioned in the circumferential grooves, wherein, as the facing flanges are made to approach each other by the fastening elements, the joint segments are rotated in opposite directions respectively, and wherein, when the positions of the peripheral edges of the arc portions corresponding to the marks come into contact with the outer surfaces of the pipes as a result of the rotation, the convex strip portions are brought into pressure contact with far end-side walls of the circumferential grooves.

(Operation and Effect)

In the housing-type pipe joint of the present invention, when the positions of the peripheral edges of the arc portions corresponding to the marks come into contact with the pipe outer surfaces, that is, when the fastening is completed, the convex strip portions are brought into pressure contact with the far end-side walls of the circumferential grooves of the pipes, and therefore, the pipes are surely coupled and fixed owing to the convex strip portions irrespective of whether there is, for example, an error in pipe diameter or an error in depth of the circumferential grooves.

Further, if gaps are left between the convex strip portions and near end-side walls of the circumferential grooves when the marks are at the fastening completion positions, the pipe ends are sealed and at the same time coupled in a state where a slight movement of the pipes trying to separate from each other is allowed while the movement of the pipes trying to approach each other is restricted. Further, when the pipes are once separated, the pipes can also thereafter move so as to approach each other. Further, the pipes are coupled in a state where a certain degree of movement of far end-sides of the pipes is allowed. Therefore, the pipe joint of the present invention can couple the pipes while ensuring expansion/contraction flexibility of a pipe channel.

<Invention According to Embodiment 3>

A housing-type pipe joint which includes a pair of joint segments, an elastic seal ring, and fastening elements fastening flanges of the pair of joint segments and couples and fixes pipes each having a circumferential groove in a pipe end portion, wherein the fastening elements make the flanges of the joint segments approach each other, wherein the joint segments each have: an arc portion; flange portions extending from both ends of the arc portion; a concave groove which is formed in an inner peripheral surface of the arc portion and in which the elastic seal ring is fit; convex strip portions formed on both sides of the concave groove on the inner peripheral surface of the arc portion and rising in a radius direction of the arc portion; and a mark provided on a peripheral edge region of the arc portion, wherein, when the flanges of the joint segments are made to approach each other by the fastening elements from a state where the convex strip portions are positioned in the circumferential grooves of the facing pipes, the joint segments bend in a direction so that radii of curvature of the arc portions of the joint segments become smaller and peripheral edges of the arc portions match outer surfaces of the pipes that are to be coupled, and the joint segments rotate in directions so that axes of the arc portions become parallel to a pipe axis and in opposite directions, and wherein, when the arc portions bend until positions of the peripheral edges of the arc portions corresponding to the marks come into contact with the outer surfaces of the pipes, the convex strip portions are brought into pressure contact with far end-side walls and near end-side walls of the circumferential grooves and the coupling of the pipes is completed.

(Operation and Effect)

The same effects as those of the invention according to embodiment 1 are exhibited. Further, in the housing-type pipe joint of the present invention, when the positions of the peripheral edges of the arc portions corresponding to the marks come into contact with the pipe outer surfaces, the convex strip portions are brought into pressure contact with the far end-side walls and the near end-side walls of the circumferential grooves, and accordingly, after being fastened, the housing-type pipe joint is surely fixed in a state where the movement of the pipes that are to be coupled in a direction in which they approach each other or in a direction in which they get away from each other is restricted.

<Invention According to Embodiment 4>

The housing-type pipe joint according to any one of embodiment 1 to 3, wherein the marks are provided on both arc end portions of the peripheral edge regions of the arc portions.

<Invention According to Embodiment 5>

The housing-type pipe joint according to any one of embodiment 1 to 3, wherein the marks are each at a position 15 to 60 degrees away from a vertical line directed from an arc center of the arc portion toward a middle of the arc portion.

(Operation and Effect)

When the positions of the marks are each the position 15 to 60 degrees away from the vertical line directed toward the middle of the arc portion, a range of each of the arc portion peripheral edges in contact with the pipe outer surface can be a 30 to 120 degree range with respect to the vertical line directed from the arc center of the arc portion of the peripheral edge toward the middle of the arc portion. This contact range is sufficient for the coupling and fixing, and a load of the fastening work is sufficiently reduced.

<Invention According to Embodiment 6>

The housing-type pipe joint according to any one of embodiment 1 to 3, wherein the peripheral edge region of the arc portion of each of the joint segments is cut at both sides so that cut portions are formed so as to extend in directions from starting points of the peripheral edge region, which are proximate to the flange portions, toward an arc middle, respectively and the marks are provided at ends of the cut portions, which are proximate to the arc middle.

(Operation and Effect)

When in the peripheral edge regions of the arc portion, the predetermined ranges starting from the flange portion-side both ends are cut and the ends of the cut portions are the marks, a force to make the flanges approach each other is reduced, and contact amounts of the peripheral edges of the arc portion and contact positions can be visually confirmed with ease, which ensures that the load of the fastening work is reduced. Further, the marks using the cut portions are desirable in view of durability because there is no risk of painting exfoliation or the like, compared with a mark using painting or the like.

[Invention According to Embodiment 7]

The housing-type pipe joint according to any one of embodiment 1 to 3, wherein the elastic seal ring has an annular piece extending toward an inner periphery side and positioned between pipe end surfaces of the pipes that are to be coupled, and the elastic seal ring is fit in advance in the concave grooves in a state where an axis of the annular piece is not parallel to axes of the joint segments.

(Operation and Effect)

In the housing-type pipe joint of the present invention, the elastic seal ring held in the housing has the annular piece. Since this annular piece extends toward the inner peripheral side of the elastic seal ring, it is possible to first make the pipe end surfaces abut on both sides of the annular piece (both edge sides of the elastic seal ring), which makes it possible to surely position the elastic seal ring of the housing-type pipe joint at a desired position even without the visual confirmation.

Further, such an elastic seal ring is supported in advance in the concave grooves of the joint segments, and accordingly, when the pipe end surfaces are made to abut on the both sides of the annular piece (both edge sides of the elastic seal ring), it is possible to position the joint segments between the pipe end portions, so that a fastening preparation can be very easily completed.

Further, the housing-type pipe joint of the present invention is held while the axis of the annular piece is not parallel to the axes of the joint segments, that is, while the axis of the annular piece is inclined relative to the axes of the joint segments, and therefore, only by making the pipe end surfaces abut on the both sides of the annular piece, the joint segments are brought into a predetermined pre-rotation state and an installation preparation is completed.

Here, in the housing-type pipe joint of the present invention, the elastic seal ring is supported in the concave grooves, and when the joint segments are rotated, the elastic seal ring is pressed by walls of the concave walls in accordance with the rotation, but owing to deformability of the elastic seal ring, the rotation of the joint segments is not restricted, and the elastic seal ring does not twist due to the rotation of the joint segments.

Further, if the elastic seal ring has groove portions between the annular piece and both end opening edges and has a lip seal function expanding widths of the grooves by a pressure of a fluid flowing to the groove portions, the widths of the groove portions are expanded between the annular piece and the both end opening edges when necessary, even if the elastic seal ring is not constantly in contact with the pipes by the pressure application, so that a sealing function is exhibited, and accordingly, the elastic seal ring deteriorates little with time and the housing-type pipe joint has high durability.

[Invention According to Embodiment 8]

The housing-type pipe joint according to any one of embodiment 1 to 3, wherein an outer peripheral-side arc end portion of each of the arc portions have: an L-shaped convex bank extending in an L-shape from an axial-direction one end side of the arc portion and projecting toward the facing joint segment; an L-shaped chipped portion formed continuously from the L-shaped convex bank to the axial-direction other end of the arc portion and chipped in the L-shape; and a stepped portion formed between the L-shaped convex bank and the L-shaped chipped portion, wherein, when the facing flanges are made to approach each other by the fastening elements and the joint segments are rotated, the joint segments move so that the L-shaped convex bank of one of the joint segments and the L-shaped chipped portion of the other joint segment engage with each other, and wherein, when the marks substantially come into contact with the outer surfaces of the pipes, the L-shaped convex bank and the L-shaped chipped portion completely engage with each other to form a spigot coupling restricting each other's movement.

(Operation and Effect)

In the housing-type pipe joint of the present invention, since the L-shaped convex bank and the L-shaped chipped portion formed continuously from the L-shaped convex bank completely engage with each other to form the spigot coupling restricting each other's movement, and therefore, the joint segments do not excessively rotate, the housing-type pipe joint can be surely set at a desired position, and the twisting of the elastic seal ring, fractures of the convex strip portions, and fractures of the pipes due to the excessive rotation are prevented.

Advantageous Effects of Invention

The concrete operations and effects of the inventions according to the respective embodiments are as described above, and according to the housing-type pipe joints of the present invention, there is commonly provided a housing-type pipe joint which couples pipes by its arc portions being bent by fastening elements such as bolts and nuts so that their radii of curvature become smaller, and which enables a reduction in a fastening work, the sure confirmation of the fastening completion position, and the easy installation of the joint at an appropriate position between the pipe ends without dissembling the housing at all, thereby making a work of coupling the pipes a very simple operation, and in addition, makes it possible to surely couple and fix the pipes even when there is an error in depth of the circumferential grooves of the pipes that are to be coupled.

In addition, this housing-type pipe joint exhibits a unique effect of capable of surely coupling the both pipes even if there is an error in depth of the circumferential grooves of the pipes that are to be coupled.

Further, the housing-type pipe joint of the present invention is capable of coupling the pipe ends while sealing them in a state where the movement of the pipes trying to approach each other is restricted and a slight movement of the pipes trying to separate from each other is allowed, and accordingly, since the pipes can be coupled loosely, extension/contraction flexibility of the pipe channel can be ensured, which is suitable for the coupling of pipes buried underground which often receive an external force, for instance.

Further, there is also provided the housing-type pipe joint capable of surely coupling and fixing both pipes owing to the fixation by the convex strip portions being pressed against the far end-side walls and the near end-side walls of the circumferential grooves.

DESCRIPTION OF EMBODIMENTS

Figure 1:
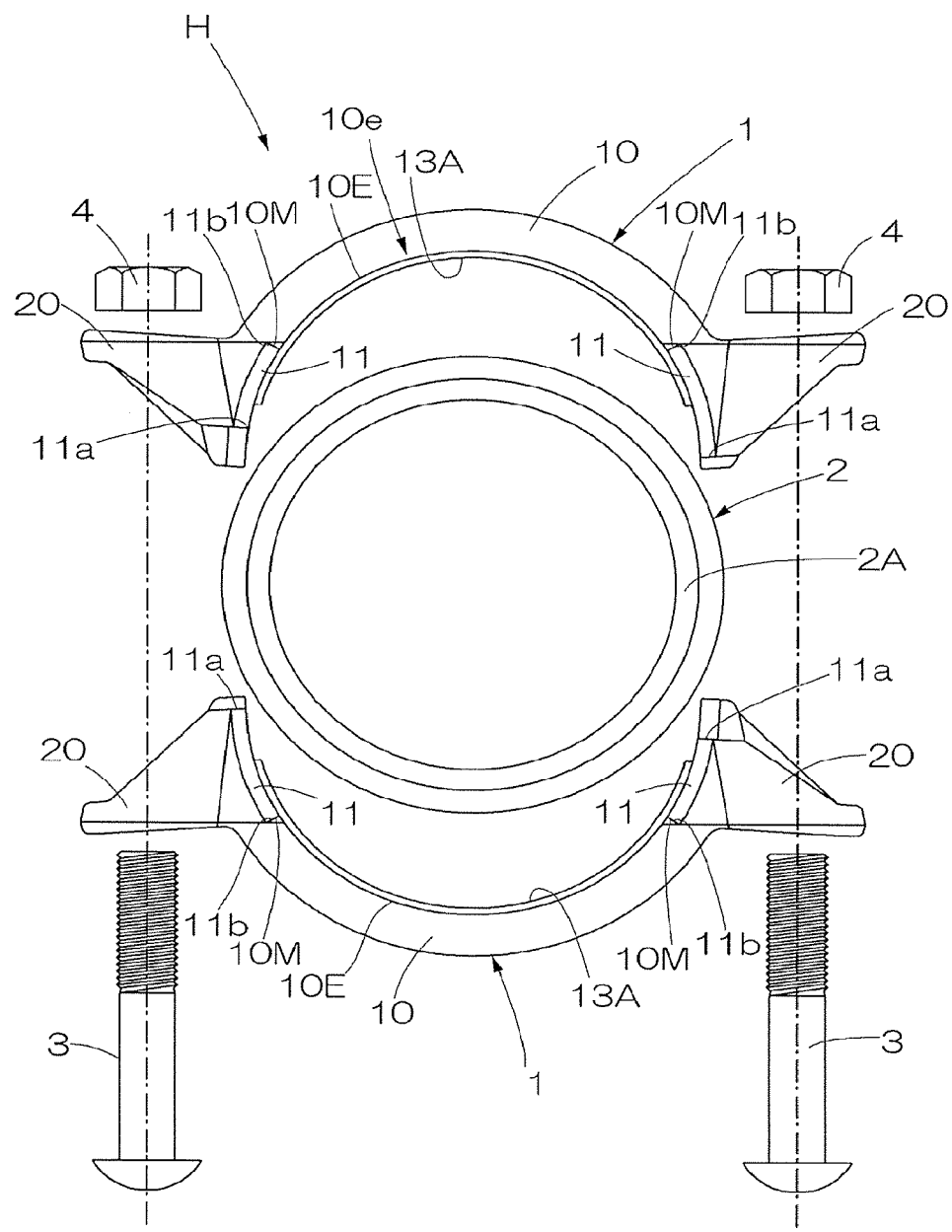
FIG. 1 is an exploded front view of a housing-type pipe joint of the present invention.
Figure 2:
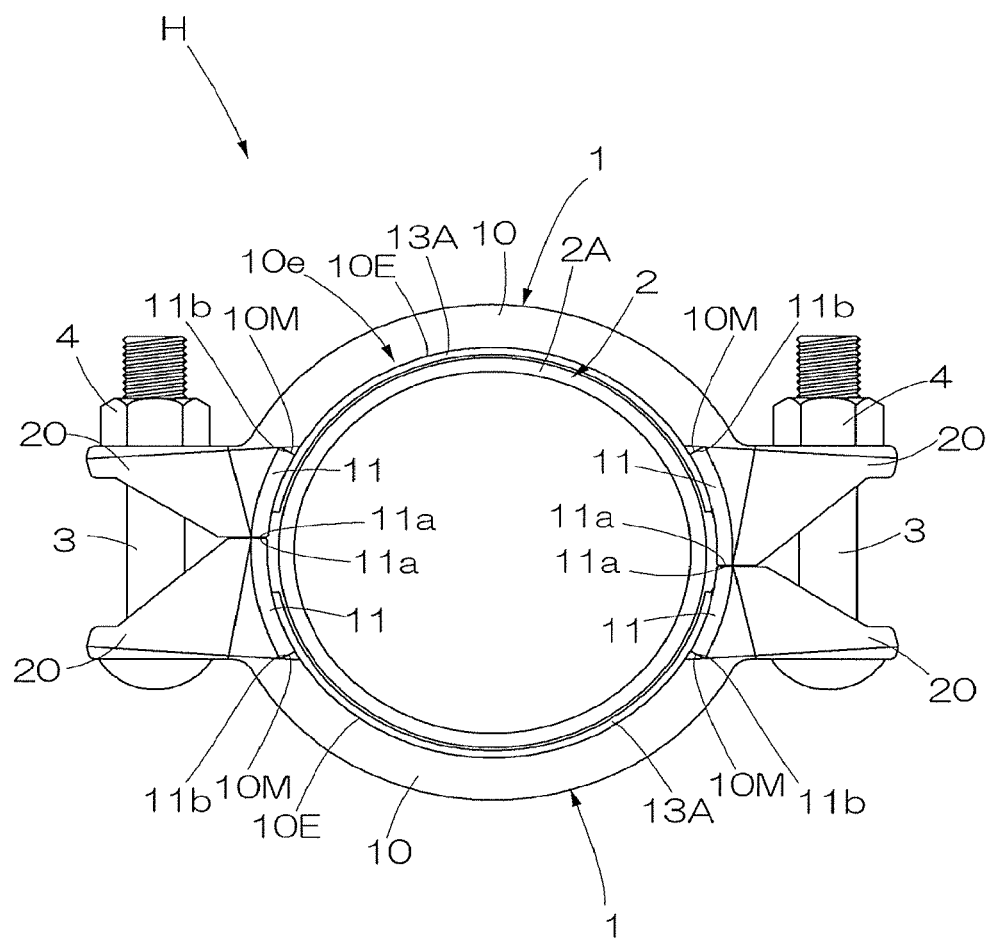
FIG. 2 is a front view of the housing-type pipe joint of the present invention after it is fastened.

Next, an embodiment of the present invention will be hereinafter described in detail with reference to FIGS. 1 to 12, mainly about a case where pipes 50, 50 having circumferential grooves 51, 51 are coupled.

<Structure>

A housing-type pipe joint H of this embodiment includes a pair of joint segments 1, 1, an annular elastic seal ring 2, and bolts 3 and nuts 4 being fastening elements for fastening the joint segments 1, 1. Here, the pair of joint segments 1, 1 have the same shape. Therefore, in the description of the shape, one of the joint segments 1 will be taken as an example.

The joint segment 1 has: an arc portion 10 in a substantially arc shape in which facing end portions of the pipes 50, 50 are housed; and flange portions 20, 20 extending out from both ends of the arc portion 10 respectively, and in the flange portions 20, 20, bolt insertion holes 21, 21 for having the bolts inserted therethrough are formed. The bolt insertion hole 21 is formed as an elliptic long hole whose major axis is an axial direction of the arc portion of the joint segment 1, and its width in a minor axis direction also has an appropriate allowance for a screw portion of the inserted bolt, thereby allowing the bolt 3 to be loosely inserted to the bolt insertion hole 21.

As a whole, the arc portion 10 is formed in advance to have a slightly larger radius of curvature than a pipe diameter of pipes 50 being coupling targets, so that pipe ends of the pipes 50 to be coupled can be easily and surely positioned in the arc portion 10. When the nuts 4 are fastened to the bolts 3 via the flange portions 20, the arc portion 10 bends so that its radius of curvature slightly becomes smaller, and such bending increases regions, of its arc portion peripheral edges 10E, abutting on outer surfaces of the pipes positioned in the arc portion. Here, one essential function of the abutting of the arc portion peripheral edges on the outer surfaces in the present invention is the restriction of the movement of the pipes by the housing-type joint for the sure fastening, and therefore, an inner peripheral surface of the arc portion is desirably a smooth arc surface from its arc portion peripheral edges up to a concave groove (up to convex strip portions when it has the convex strip portions).

Note that the joint segments 1, 1 of this embodiment are structured such that especially the flange portions 20, 20 are formed integrally with the arc portions 10, 10, with their angle relative to ends of the arc portions 10, 10 being a slight acute angle, as is apparent from a front view shown in FIG. 1, whereby a bending force is easily applied so as to decrease the radii of curvature of the arc portions 10, 10.

Here, as a feature of the joint segment 1 of the present invention, marks 10M are formed on both arc end portions of its arc portion peripheral edge regions 10e, and when the arc portion peripheral edges 10E corresponding to the marks 10M come into contact with outer surfaces of the pipes 50, the coupling of the pipes is completed. Here, the arc portion peripheral edge regions 10e refer to the vicinities of the arc portion peripheral edges 10E and at least regions visible in the front view of the housing-type joint.

In the illustrated preferable form, as for the marks 10M, predetermined ranges whose starting points 11a are both flange portion-side ends of the arc portion peripheral edge regions 10e of the joint segment 1 are cut, and ends 11b of the cut portions 11 are the marks 10M. When the ends 11b of the cut portions are used as the marks, a force for making the flange portions approach each other is reduced owing to the existence of the cut portions 11, and contact amounts (lengths) and contact positions of the arc portion peripheral edges 10 are very easily confirmed, which surely reduces a load of the fastening work. Further, the marks 10M by means of the cut portions 11 do not involve a risk of painting exfoliation or the like compared with marks using paint or the like, which is desirable also in view of durability. Further, the use of the cut portions 11 as the marks 10M is desirable also in view of that the confirmation by touching with a hand is also possible.

Figure 4:
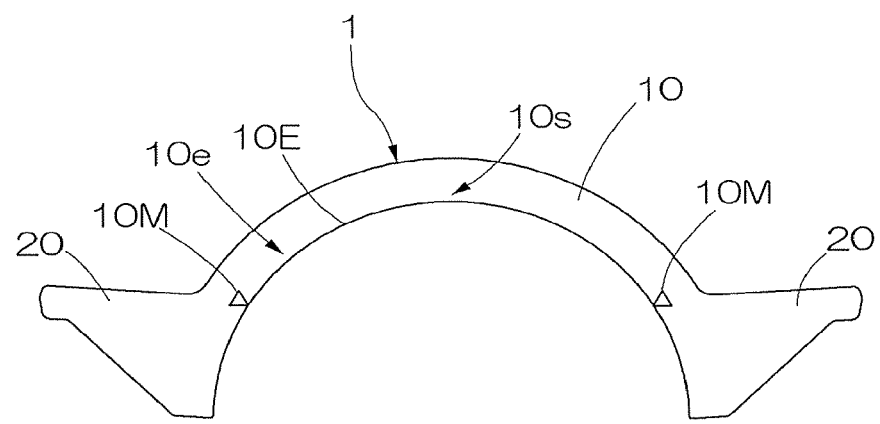
FIG. 4 is a schematic front view of a joint segment of another form of the present invention.
Figure 5:
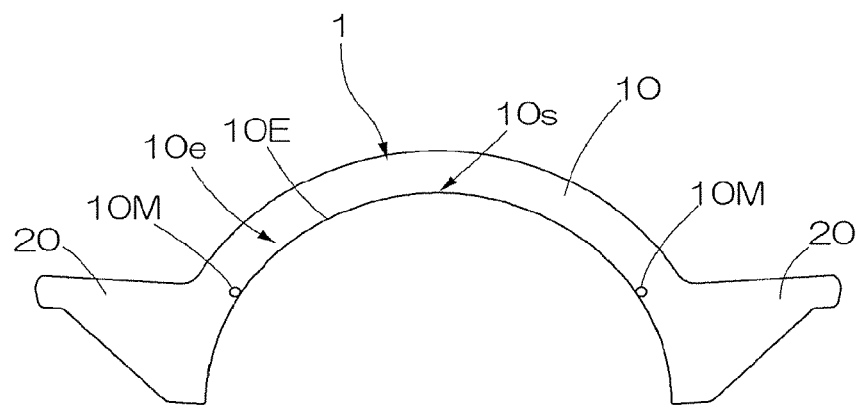
FIG. 5 is a schematic front view of a joint segment of still another form of the present invention.

Of course, it is only necessary that the positions of the marks 10M can be confirmed, and the marks 10M are not limited to the cut form and may be forms such as, for example, triangular marks, circular marks, and the like as shown in FIGS. 4 and 5 or calibrations or characters provided all along or partly along the peripheral edge regions, though not shown. Of course, in this case as well, concrete structures thereof can be those that can be confirmed visually or by touching, such as painting (printing) or projections.

Figure 3:
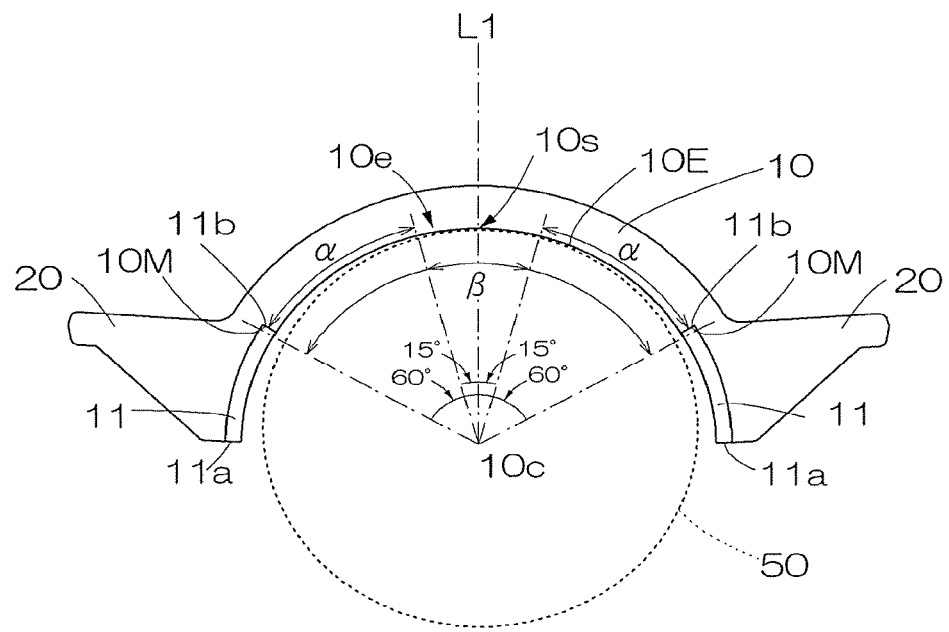
FIG. 3 is a schematic front view showing states before and after joint segments of the present invention are fastened.
Figure 3:
Figure 3:
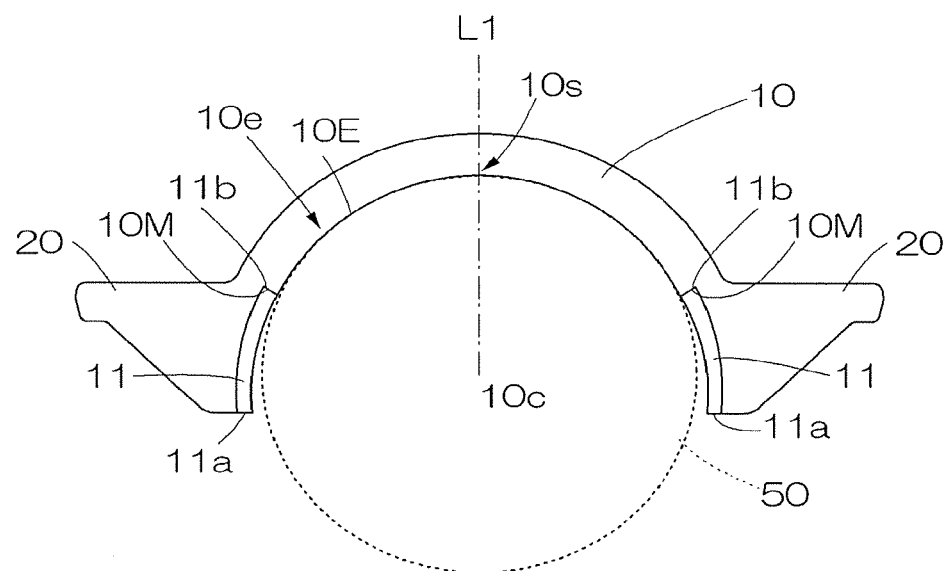

More concretely, a position of each of the marks 10M is preferably within a 15 to 60 degree range with respect to a vertical line L1 directed from an arc center 10c of the arc portion 10 toward a middle of the arc portion (this range is shown by a in FIG. 3). When the marks 10M are within this range, at least 30 to 120 degree ranges of the arc portion peripheral edges 10E (this range is shown by β in the drawing) match the outer surfaces of the pipes 50 that are to be coupled, to abut thereon at the time of the completion of the fastening, and generally, if the ranges of about β match, the pipes 50 and the joint segment 1 do not deviate from each other after the completion of the fastening. Further, even if the positions are at or beyond 60 degrees, that is, even if 120 degree ranges or more of the arc portion peripheral edges 10E match the outer surfaces of the pipes 50 that are to be connected, an improvement of the effect of preventing the deviation between the pipes 50 and the joint segment 1 is small, and nevertheless, the fastening force excessively increases, resulting in a need for an unnecessary work amount and force.

Further, the housing-type pipe joint H of this embodiment adopts the following preferable structures while having the above-described characteristic marks 10M.

Figure 6:
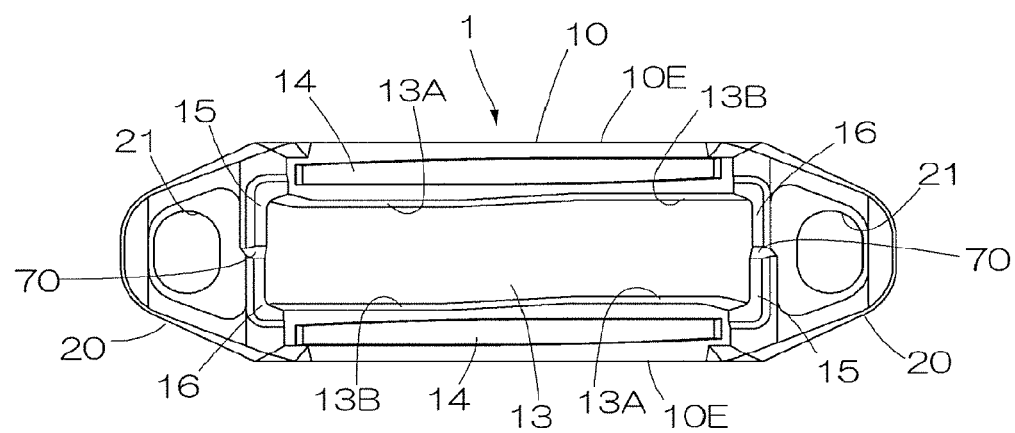
FIG. 6 is a view of an inner surface of the joint segment of the present invention.
Figure 7:
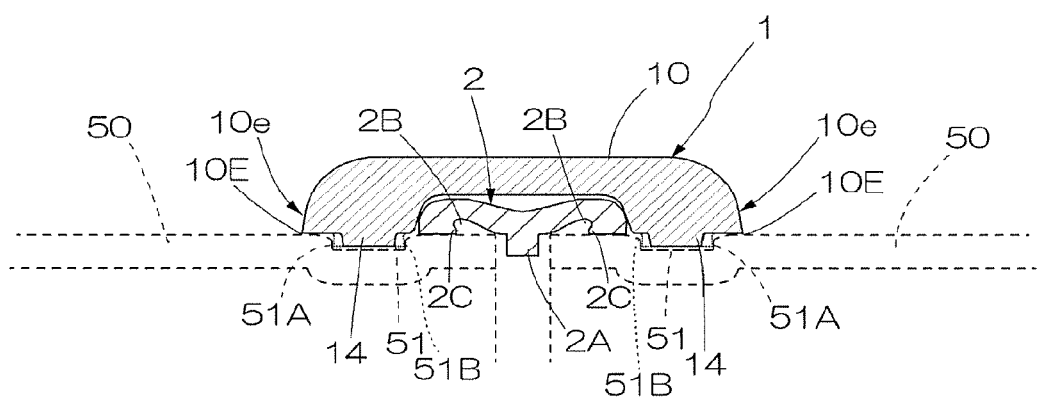
FIG. 7 is a partial sectional view of the joint segment of the present invention.

Firstly, as shown especially in FIGS. 6, 7, in the inner peripheral surface of the arc portion 10, a concave groove 13 for housing the elastic seal ring 2 is formed so as to extend from one arc end toward the other arc end, and the concave groove 13 has a width substantially equal to or slightly wider than a width of the elastic seal ring 2 and a depth large enough to allow the elastic seal ring 2 to fit therein.

On flange-portion sides of facing sidewalls of the concave groove 13, a pair of bulging portions 13A bulging toward an inner side of the groove are formed in point symmetry. A reference point of the point symmetry is basically a midpoint of a width direction and an axial direction of the arc portion 10, but an appropriate reference point can be set depending on a design error, the structure of the concave groove, and other structure. Owing to the presence of the bulging portions 13A, the elastic seal ring 2 is fit in the concave groove 13, with its axis having a predetermined angle relative to an axis of the arc portion 10 of the joint segment 1. Here, considering that an ordinary joint segment 1 is manufactured as a casting, the bulging portions 13A are preferably formed as walls continuing from non-bulging portions 13B of the concave groove sidewalls, and more preferably as smooth continuous surfaces, in order to enable good removal of the concave groove 13 portion from a mold. Further, by thus forming them as the continuous walls or as the smooth continuous surfaces, when the elastic seal ring 2 is fit in the concave groove 13, it elastically deforms along the sidewalls of the concave groove 13, so that the elastic seal ring 2 is supported by the whole walls of the concave groove. This prevents a situation where the elastic seal ring 2 is unstably housed in the concave groove by being partially supported or a stress is locally given due to the partial support. Therefore, such a form of the bulging portions 13A is preferable also in view of durability of the elastic seal ring.

On the other hand, on both sides of the concave groove 13, convex strip portions 14, 14 are provided to rise in the radius direction of the arc portion 10. These convex strip portions 14, 14 are formed along the arc of the arc portion 10 and are positioned in the circumferential grooves 51, 51 of the pipes when the pipe ends of the pipes 50, 50 to be connected are housed in the arc portion 10. A separation distance between the convex strip portions 14, 14 is arbitrarily selected in consideration of a separation distance between the circumferential groove 51 and the pipe end. Incidentally, the convex strip portions 14, 14 are unnecessary structures when the joint segments connect pipes not having the circumferential grooves.

Figure 8:
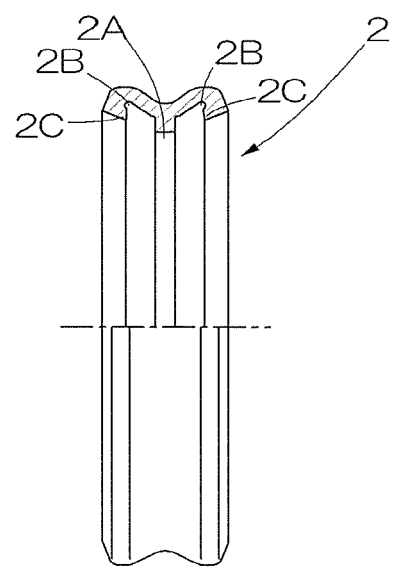
FIG. 8 is a partial sectional view of an elastic seal ring according to the present invention.

Further, the elastic seal ring 2 housed in the concave groove 13 has an annular piece 2A provided substantially at the middle between its both end surfaces so as to extend to an inner periphery side as shown especially in FIG. 8. The annular piece 2A has such a length as to project to a more axial center side than the inner peripheral surface of the arc portion 10 when it is housed in the concave groove 13, and when the pipes 50 are coupled, the annular piece 2A is positioned between the pipe end surfaces of the pipes. Further, the elastic seal ring 2 has groove portions 2B between the annular piece 2A and both end opening edges to exhibit a so-called lip seal function. In particular, in the elastic seal ring 2 of this embodiment, there are provided tongue piece portions 2C which are both end-side edges of the groove portions 2B slightly returning in the annular piece direction, and when widths of the grooves are expanded by a pressure of a fluid flowing to the groove portions 2B, the tongue piece portions 2C are in pressure contact with the pipe outer surfaces, so that a better sealing effect is exhibited. Here, the elastic seal ring 2 is held in a state where at least the axis of its annular piece 2A is non-parallel to and thus deviated from the axis of the arc portion 10 due to the bulging portions 13A, 13A as described above.

Further, there are provided L-shaped convex banks 15 each disposed in an L-shape from an axial-direction one end of the arc portion end and L-shaped chipped portions 16 each formed continuously from the L-shaped convex bank 15 to the axial-direction other end of the arc portion 10. The L-shaped chipped portion 16 is chipped substantially in the same shape as the shape of the L-shaped convex bank 15, and when the L-shaped convex bank 15 formed in one of the joint segments 1 and the L-shaped chipped portion 16 formed in the other joint segment engage with each other, a spigot coupling is formed.

Figure 9:
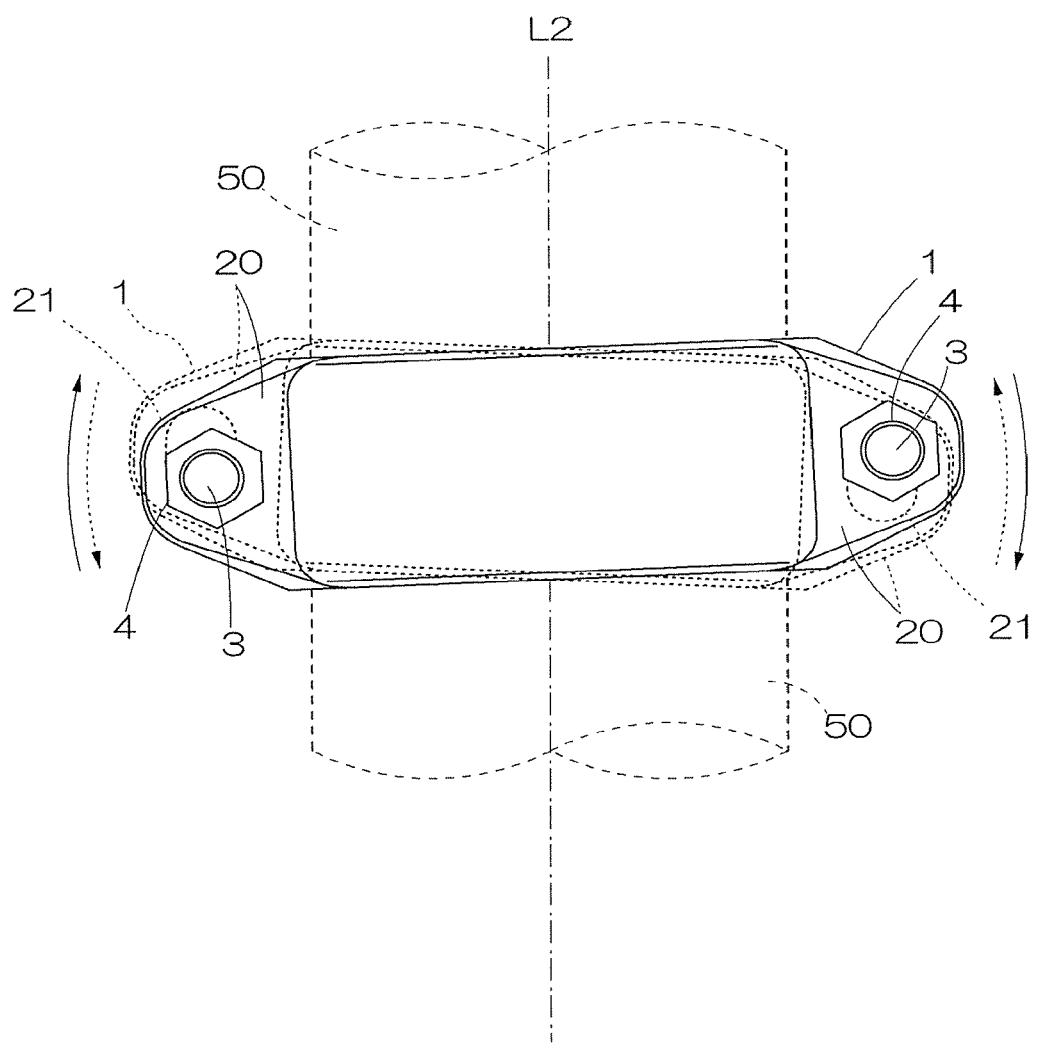
FIG. 9 is a plane view of the housing-type pipe joint of the present invention before it is fastened.

In the housing-type pipe joint H in the preferable form of this embodiment described above, in a temporary coupling state where the nuts 4, 4 are only attached to the bolts 3, 3 in a state where the bolts 3, 3 are hung between the bolt insertion holes 21, 21 of the pair of facing joint segments 1, 1, the bolt insertion holes 21, 21 have allowance for the screw portions of the bolts 3, and the pair of joint segments 1, 1 are in a state of being relatively rotatable while maintaining a twisting relation as shown in FIG. 9.

Therefore, in the housing-type pipe joint H of this embodiment, because of the form of holding the elastic seal ring 2 in the concave groove owing to the aforesaid bulging portions 13A, 13A, when the pipe end surfaces of the pipes 50, 50 to be coupled are made to abut on the annular piece 2A projecting from the inner peripheral surface of the arc portion 10, the joint segments 1, 1 are in a state of deviating from each other with respect to a pipe axis L2 as shown in FIG. 9.

Under the above-described preferably structure, the housing-type pipe joint H of the present invention is structured so that, as the radii of curvature of the arc portions 10 are decreased by the fastening of the nuts 4 to the bolts 3, the joint segments 1, 1 are rotated in opposite directions as shown by the arrows in FIG. 9, and when the marks 10M substantially come into contact with the pipe outer surfaces, the convex strip portions 14 are brought into pressure contact with far end-side walls 51A of the circumferential grooves 51, resulting in a rotation completion position, that is, a fastening completion position.

Consequently, as described above, the pipes are surely coupled and fixed owing to the convex strip portions 14, irrespective of the presence/absence of, for example, an error in pipe diameter or an error in depth of the circumferential grooves, and if the design is made so that gaps are left between the convex strip portions 14 and near end-side walls of the circumferential grooves 51 when the fastening completion position is produced, the both pipe ends are coupled while being sealed, in a state where the slight movement of the pipes trying to separate from each other is allowed while the movement of the pipes trying to approach each other is restricted. Further, when the pipes are once separated from each other, the pipes can also thereafter make an approaching movement. Further, the pipes are coupled in a state where a certain degree of movement of far-end sides of the pipes is permitted. Therefore, the pipe joint of the present invention can couple the pipes while ensuring the extension/contraction flexibility of a pipe channel.

Figure 10:
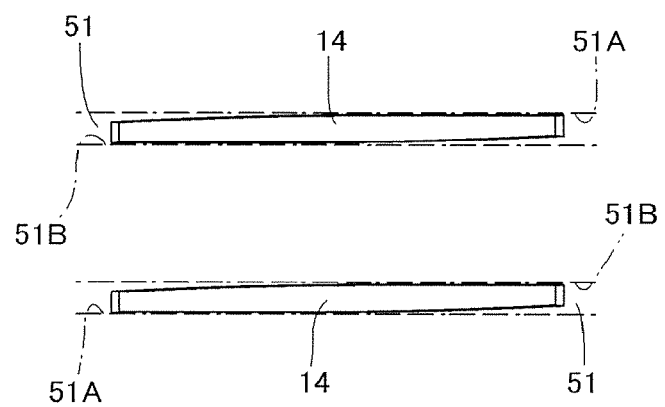
FIG. 10 is a plane view showing a positional relation between convex strip portions and circumferential grooves after the housing-type pipe joint of the present invention is fastened.
Figure 11:
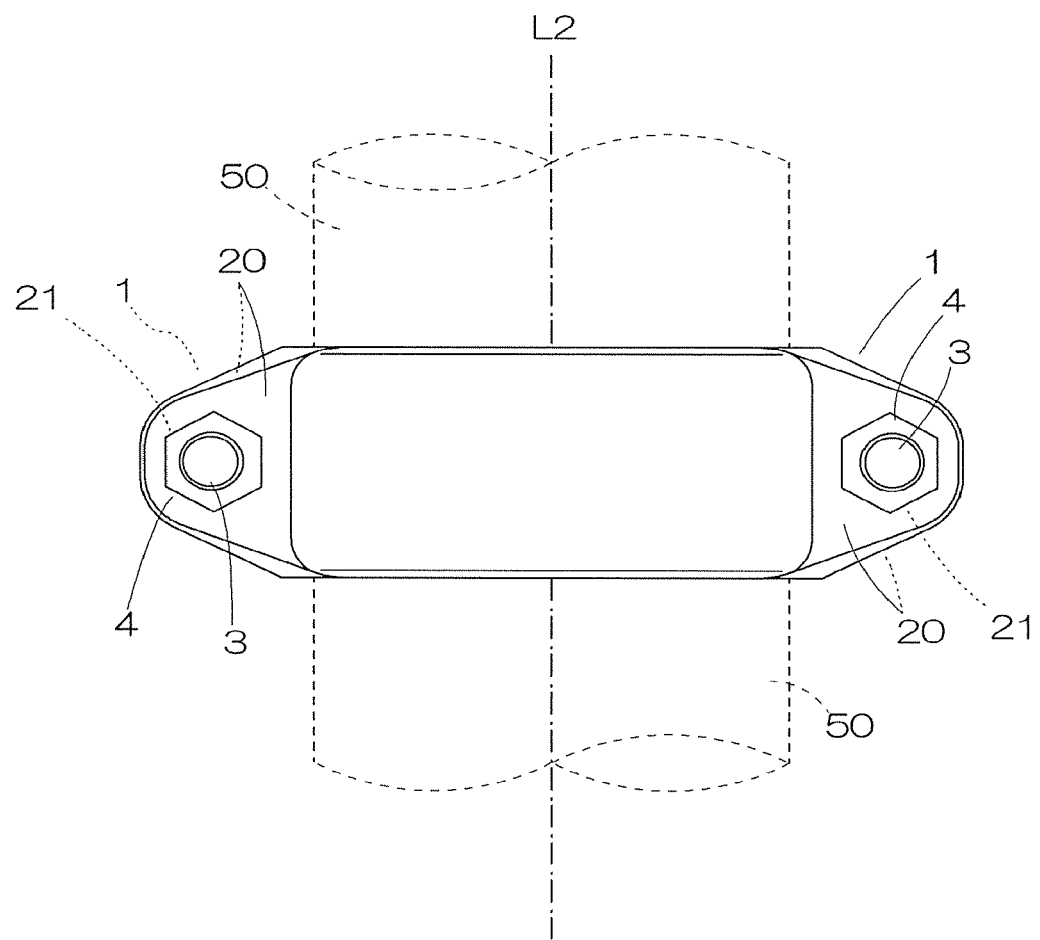
FIG. 11 is a plane view of the housing-type pipe joint of the present invention after it is fastened.

Further, under the above-described structure, the housing-type pipe joint H of the present invention may also be structured so that, as the radii of curvature of the arc portions 10 are decreased by the aforesaid fastening of the nuts 4 to the bolts 3, the joint segments 1, 1 are rotated in opposite directions as shown by the arrows in FIG. 9, and when the marks 10M substantially come into contact with the pipe outer surfaces, the convex strip portions 14 are brought into pressure contact with the far end-side walls 51A and near end-side walls 51B of the circumferential grooves 51 of the pipes as shown in FIG. 10, resulting in the rotation completion position, that is, the fastening completion position.

In this case, the pipes are surely coupled and fixed owing to the convex strip portions 14 irrespective of the presence/absence of, for example, an error in pipe diameter or an error in depth of the circumferential grooves, and further, when the fastening completion position is produced, the both pipe ends are sealed and coupled in a state where the movements of the pipes trying to approach each other and separate from each other are restricted.

Note that a concrete relation between a rotation amount of the joint segment 1 and the positions of the marks 10M is appropriately designed according to a diameter of pipes to be connected, a shape of the convex strip portions 14, a rotating mechanism, and so on. Further, in the example shown in FIG. 12, as a preferable example, adopted is the form where, when the axis of the arc portion 10 and the pipe axis L2 become parallel or coaxial, the marks 10M match the outer surfaces of the pipes 50, resulting in the completion of the fastening, but this is not restrictive.

Here, as examples of the rotating mechanism for the joint segments 1 in the housing-type pipe joint H of this embodiment, rotating mechanisms disclosed in Japanese Patent Application Laid-open No. 2008-019976 (Patent Literature 3) and Japanese Patent Application Laid-open No. 2008-019975 (Patent Literature 4) are adoptable. More concretely, the following structures can be shown as examples: (1) a mechanism in which, when the nuts 4 are fastened to the bolts 3, the bolts 3 are moved by being guided by the bolt insertion holes 21 so that the bolt axes become parallel to each other, and the bolts 3 and the nuts 4 press edge portions of the bolt insertion holes 21 or their vicinities to give a rotational force to the joint segments 1, 1; (2) a structure in which guide convex portions promoting the rotation are provided on the facing flange portions 20, and in accordance with the approach of the flanges due to the fastening of the nuts 4 to the bolts 3, the guide convex portions function to cause the rotation; and (3) a structure in which the L-shaped convex portions and the L-shaped chipped portions have a guide function to rotate the joint segments as they engage with each other. Of course, other known rotating mechanisms are adoptable, and a plurality of rotating mechanisms can also be used in combination.

<How to Use>

Next, how the housing-type pipe joint H of this embodiment is used will be described.

Owing to its structure, the housing-type pipe joint H of this embodiment described above is capable of bringing the pair of joint segments 1, 1 into a temporarily coupled state by the bolts 3, 3 and the nuts 4, 4 while holding the elastic seal ring 2 in the concave groove 13. This temporarily coupled state is a state where the facing flange portions 20, 20 can approach each other and separate from each other even though the pair of joint segments 1, 1 are coupled by the bolts 3, 3 and the nuts 4, 4.

In coupling the pipes 50, 50, the housing-type pipe joint H is temporarily installed in such a manner that the pipe end surfaces of the pipes 50, 50 to be coupled are first made to abut on the annular piece 2A of the elastic seal ring 2 held by the both joint segments 1, 1 which are in the temporarily coupled state, and the convex strip portions 14 are positioned in the circumferential grooves 51 formed in the pipe end portions. Incidentally, the abutting of the pipe end surfaces on the annular piece 2A can be easily detected by senses except visual sense, such as touching or sound at this time.

After the housing-type pipe joint H is temporarily installed on the pipe ends, the nuts 4, 4 are next fastened to the bolts 3, 3 to make the flanges 20, 20 of the both joint segments 1, 1 approach each other. At this time, as is also understood from FIG. 3, arc middle portions 10s of the arc portions 10, 10 or regions including their vicinities first abut on the outer surfaces of the pipes 50 as the joint segments 1, 1 approach each other, and thereafter in the joint segments 1, 1, regions such as the arc portion middle portions 10s or the like first bend and then their flange portion 20 sides bend so that the arc portion peripheral edges 10E of the joint segments 1, 1 come close to the outer surfaces of the pipes 50, and the radii of curvature of the arc portions 10, 10 decrease.

Then, in accordance with the approach of the flange portions 20, 20 due to the fastening of the nuts 4, 4, the joint segments 1, 1 are rotated in opposite directions, and consequently, the L-shaped convex banks 15, 15 and the facing L-shaped chipped portions 16, 16 start to engage with each other.

Figure 12:
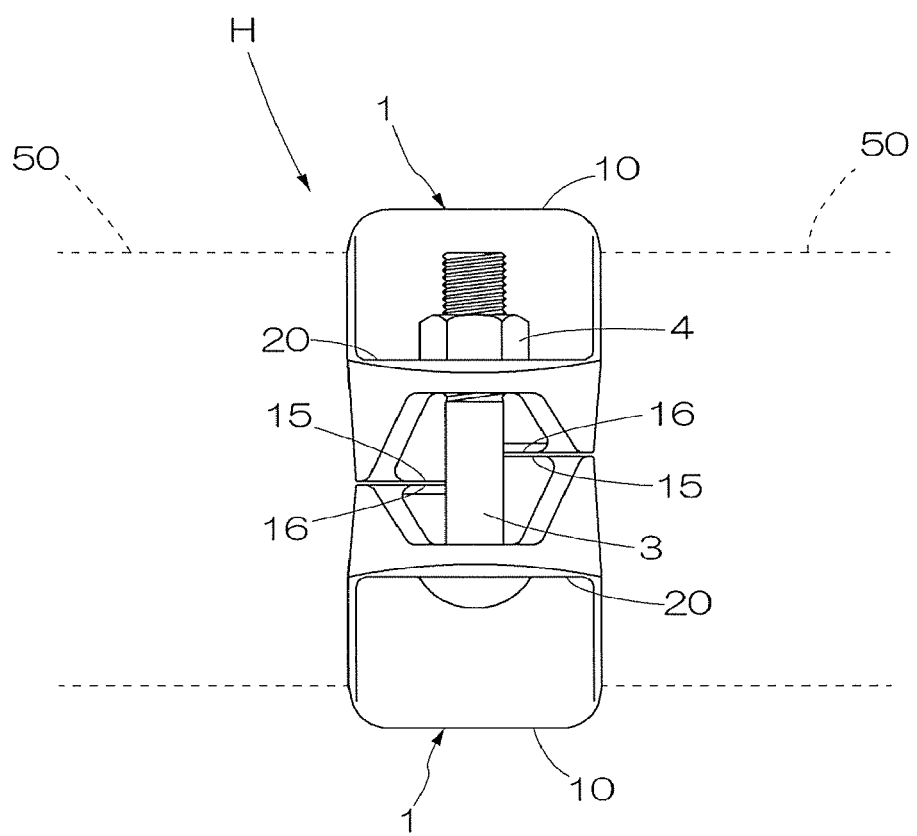
FIG. 12 is a side view of the housing-type pipe joint of the present invention.
Figure 13:
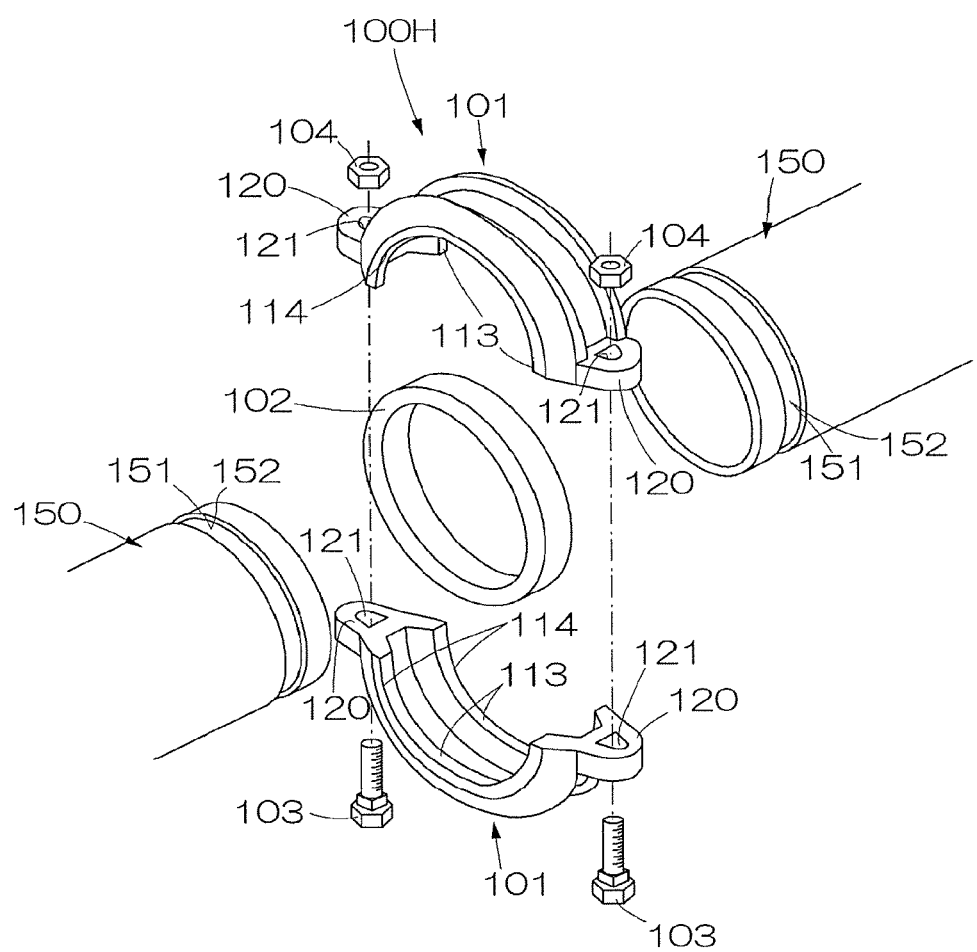
FIG. 13 is an exploded perspective view of a conventional housing-type pipe joint.

Then, as also shown in FIG. 12, when the positions corresponding to the marks 10M formed in the joint segments 1, 1 come into contact with the outer surfaces of the pipes 50, the facing L-shaped convex banks and L-shaped chipped portions 16 completely engage with each other to form the spigot coupling, so that the rotation of the facing joint segments 1, 1 is restricted and the convex strip portions 14 are brought into pressure contact with the far end-side walls 51A of the circumferential grooves 51, whereby the fastening is completed.

Incidentally, another adoptable structure is that the positions corresponding to the marks 10M formed on the joint segments 1, 1 come into contact with the outer surfaces of the pipes 50 and the facing L-shaped convex banks 15 and L-shaped chipped portions 16 completely engage with each other to form the spigot coupling, so that the rotation of the facing joint segments 1, 1 is restricted, and as shown in FIG. 10, the convex strip portions 14 are brought into pressure contact with the far end-side walls 51A and the near end-side walls 51B, whereby the fastening is completed.

As described above, it is possible to temporarily install the housing-type pipe joint H of this embodiment at an appropriate position between the pipe ends with ease and without dissembling the housing at all, and in addition, the fastening work can be reduced, and the fastening end position can be confirmed when the marks 10M match the outer surfaces of the pipes 50, that is, when the pipes are surely coupled, and further, even if there is an error in depth of the circumferential grooves of the pipes to be coupled, it is possible to surely couple and fix the both pipes.

INDUSTRIAL APPLICABILITY

The present invention is usable in fields for coupling various kinds of fluid pipes such as water pipes, gas pipes, and plant pipes while keeping them airtight.

REFERENCE SIGNS LIST

1 . . . joint segment, 2 . . . elastic seal ring, 2A . . . annular piece, 2B . . . groove portion, 2C . . . tongue piece portion, 3 . . . bolt, 4 . . . nut, 10 . . . arc portion, 10E . . . arc portion edge, 10e . . . arc portion peripheral edge region, 10M . . . mark, 10c . . . arc center, 10s . . . arc middle portion, L1 . . . vertical line directed from arc center toward middle of arc portion (arc portion middle), 11 . . . cut portion, 11a . . . starting point of cut portion, 11b . . . end of cut portion, 13 . . . concave groove, 13A . . . bulging portion, 13B . . . non-bulging portion, 14 . . . convex strip portion, 15 . . . L-shaped convex portion, 16 . . . L-shaped chipped portion, 20 . . . flange portion, 21 . . . bolt insertion hole, 50 . . . pipe, 51 . . . circumferential groove, 51A . . . far end-side wall of circumferential groove, 51B . . . near end-side wall of circumferential groove, L2 . . . pipe axis, H . . . housing-type pipe joint, 70 . . . a stepped portion formed between the L-shaped convex bank and the L-shaped chipped portion

The invention claimed is:

1. A housing-type pipe joint that couples pipes facing each other,
   which includes a pair of joint segments, an elastic seal ring, and fastening elements fastening the pair of joint segments, and
   in which the joint segments each have an arc portion, flange portions extending from both ends of the arc portion, and a concave groove formed in an inner peripheral surface of the arc portion to have the elastic seal ring fit therein, and
   in which the fastening elements make the flanges of the both joint segments approach each other to make the arc portions bend so that radii of curvature of the arc portions become smaller, and when, as a result of the bending, peripheral edges of the arc portions match outer surfaces of the pipes that are to be coupled, the coupling of the pipes is completed,
   the housing-type pipe joint comprising marks on peripheral edge regions of the arc portions,
   wherein, when positions of the peripheral edges of the arc portions corresponding to the marks come into contact with the outer surfaces of the pipes, the coupling of the pipes is completed,
   wherein the peripheral edge region of the arc portion of each of the joint segments is cut at both sides so that cut portions are formed so as to extend in directions from starting points of the peripheral edge region, which are proximate to the flange portions, toward an arc middle, respectively and the marks are provided at ends of the cut portions, which are proximate to the arc middle.

2. The housing-type pipe joint according to claim 1,
   wherein the housing-type pipe joint couples and fixes pipes each having a circumferential groove in a pipe end portion,
   wherein the joint segments each have convex strip portions provided on an inner peripheral surface of the arc portion and positioned in the circumferential grooves,
   wherein, as the facing flanges are made to approach each other by the fastening elements, the joint segments are rotated in opposite directions respectively, and
   wherein, when the positions of the peripheral edges of the arc portions corresponding to the marks come into contact with the outer surfaces of the pipes as a result of the rotation, the convex strip portions are brought into pressure contact with far end-side walls of the circumferential grooves.

3. The housing-type pipe joint according to claim 2, wherein the marks are provided on both arc end portions of the peripheral edge regions of the arc portions.

4. The housing-type pipe joint according to claim 2, wherein the marks are each at a position 15 to 60 degrees away from a vertical line directed from an arc center of the arc portion toward a middle of the arc portion.

5. The housing-type pipe joint according to claim 2, wherein the elastic seal ring has an annular piece extending toward an inner periphery side and positioned between pipe end surfaces of the pipes that are to be coupled, and the elastic seal ring is fit in advance in the concave grooves in a state where an axis of the annular piece is not parallel to axes of the joint segments.

6. The housing-type pipe joint according to claim 2,
   wherein an outer peripheral-side arc end portion of each of the arc portions has: an L-shaped convex bank extending in an L-shape from an axial-direction one end side of the arc portion and projecting toward the facing joint segment; an L-shaped chipped portion formed continuously from the L-shaped convex bank to the axial-direction other end of the arc portion and chipped in the L-shape; and a stepped portion formed between the L-shaped convex bank and the L-shaped chipped portion,
   wherein, when the facing flanges are made to approach each other by the fastening elements and the joint segments are rotated, the joint segments move so that the L-shaped convex bank of one of the joint segments and the L-shaped chipped portion of the other joint segment engage with each other, and
   wherein, when the marks substantially come into contact with the outer surfaces of the pipes, the L-shaped convex bank and the L-shaped chipped portion completely engage with each other to form a spigot coupling restricting each other's movement.

7. The housing-type pipe joint according to claim 1, wherein the marks are provided on both arc end portions of the peripheral edge regions of the arc portions.

8. The housing-type pipe joint according to claim 1, wherein the marks are each at a position 15 to 60 degrees away from a vertical line directed from an arc center of the arc portion toward a middle of the arc portion.

9. The housing-type pipe joint according to claim 1, wherein the elastic seal ring has an annular piece extending toward an inner periphery side and positioned between pipe end surfaces of the pipes that are to be coupled, and the elastic seal ring is fit in advance in the concave grooves in a state where an axis of the annular piece is not parallel to axes of the joint segments.

10. The housing-type pipe joint according to claim 1,
    wherein an outer peripheral-side arc end portion of each of the arc portions has: an L-shaped convex bank extending in an L-shape from an axial-direction one end side of the arc portion and projecting toward the facing joint segment; an L-shaped chipped portion formed continuously from the L-shaped convex bank to the axial-direction other end of the arc portion and chipped in the L-shape; and a stepped portion formed between the L-shaped convex bank and the L-shaped chipped portion,
    wherein, when the facing flanges are made to approach each other by the fastening elements and the joint segments are rotated, the joint segments move so that the L-shaped convex bank of one of the joint segments and the L-shaped chipped portion of the other joint segment engage with each other, and
    wherein, when the marks substantially come into contact with the outer surfaces of the pipes, the L-shaped convex bank and the L-shaped chipped portion completely engage with each other to form a spigot coupling restricting each other's movement.

11. A housing-type pipe joint which includes a pair of joint segments, an elastic seal ring, and fastening elements fastening flanges of the pair of joint segments and couples and fixes pipes each having a circumferential groove in a pipe end portion,
    wherein the fastening elements make the flanges of the joint segments approach each other,
    wherein the joint segments each have: an arc portion; flange portions extending from both ends of the arc portion; a concave groove which is formed in an inner peripheral surface of the arc portion and in which the elastic seal ring is fit; convex strip portions formed on both sides of the concave groove on the inner peripheral surface of the arc portion and rising in a radius direction of the arc portion; and a mark provided on a peripheral edge region of the arc portion, wherein, when the flanges of the joint segments are made to approach each other by the fastening elements from a state where the convex strip portions are positioned in the circumferential grooves of the facing pipes, the joint segments bend in a direction so that radii of curvature of the arc portions of the joint segments become smaller and peripheral edges of the arc portions match outer surfaces of the pipes that are to be coupled, and the joint segments rotate in directions so that axes of the arc portions become parallel to a pipe axis and in opposite directions, and wherein, when the arc portions bend until positions of the peripheral edges of the arc portions corresponding to the marks come into contact with the outer surfaces of the pipes, the convex strip portions are brought into pressure contact with far end-side walls and near end-side walls of the circumferential grooves and the coupling of the pipes is completed, wherein the peripheral edge region of the arc portion of each of the joint segments is cut at both sides so that cut portions are formed so as to extend in directions from starting points of the peripheral edge region, which are proximate to the flange portions, toward an arc middle, respectively and the marks are provided at ends of the cut portions, which are proximate to the arc middle.

12. The housing-type pipe joint according to claim 11, wherein the marks are provided on both arc end portions of the peripheral edge regions of the arc portions.

13. The housing-type pipe joint according to claim 11, wherein the marks are each at a position 15 to 60 degrees away from a vertical line directed from an arc center of the arc portion toward a middle of the arc portion.

14. The housing-type pipe joint according to claim 11, wherein the elastic seal ring has an annular piece extending toward an inner periphery side and positioned between pipe end surfaces of the pipes that are to be coupled, and the elastic seal ring is fit in advance in the concave grooves in a state where an axis of the annular piece is not parallel to axes of the joint segments.

15. The housing-type pipe joint according to claim 11,
wherein an outer peripheral-side arc end portion of each of the arc portions has: an L-shaped convex bank extending in an L-shape from an axial-direction one end side of the arc portion and projecting toward the facing joint segment; an L-shaped chipped portion formed continuously from the L-shaped convex bank to the axial-direction other end of the arc portion and chipped in the L-shape; and a stepped portion formed between the L-shaped convex bank and the L-shaped chipped portion, wherein, when the facing flanges are made to approach each other by the fastening elements and the joint segments are rotated, the joint segments move so that the L-shaped convex bank of one of the joint segments and the L-shaped chipped portion of the other joint segment engage with each other, and wherein, when the marks substantially come into contact with the outer surfaces of the pipes, the L-shaped convex bank and the L-shaped chipped portion completely engage with each other to form a spigot coupling restricting each other's movement.

* * * * *